United States Patent [19]

Sugimura et al.

[11] 4,020,872
[45] May 3, 1977

[54] ACCUMULATOR

[76] Inventors: Nobuyuki Sugimura; Kazuo Sugimura, both of 308 Mabase, Shimizu, Shizuoka, Japan

[22] Filed: Nov. 13, 1975

[21] Appl. No.: 631,540

[52] U.S. Cl. .............................................. 138/30
[51] Int. Cl.² ........................................ F16L 55/04
[58] Field of Search ............... 138/30; 220/85 B; 251/61, 61.2

[56] References Cited

UNITED STATES PATENTS

| | | | |
|---|---|---|---|
| 2,246,621 | 6/1941 | Davis | 138/30 X |
| 2,349,321 | 5/1944 | White | 138/30 |
| 2,492,014 | 12/1949 | Spalding et al. | 138/30 X |
| 2,721,580 | 10/1955 | Greer | 138/30 |
| 2,786,488 | 3/1957 | Mercier | 138/30 |
| 2,932,322 | 4/1960 | Mercier | 138/30 |
| 3,082,793 | 3/1963 | Sugimura | 138/30 |
| 3,109,458 | 11/1963 | Mercier | 138/30 |
| 3,948,287 | 4/1976 | Sugimura et al. | 138/301 |
| R23,333 | 1/1951 | Mercier | 138/30 |
| R23,437 | 12/1951 | Mercier | 138/30 |

*Primary Examiner*—Richard E. Aegerter
*Assistant Examiner*—James E. Bryant, III
*Attorney, Agent, or Firm*—Hofgren, Wegner, Allen, Stellman & McCord

[57] ABSTRACT

In an accumulator consisting of a high pressure cylindrical oil vessel and a gas bladder of same figure concentrically housed therein, at the bottom of said gas bladder is provided a cushion cup with its opening upside, when the gas bladder expands in a longitudinal direction said cushion cup comes to directly contacts a poppet valve provided at the port of said oil vessel to that the bladder is not ruptured and when the gas bladder contracts in a longitudinal direction, said gas bladder can get away easily from the poppet valve.

3 Claims, 5 Drawing Figures

ACCUMULATOR

This invention relates to an improved pressure vessel of an accumulator for accumulating pressure liquid or oil. More specifically, this invention relates to an improvement of accumulator consisting of a cylindrical vessel in which is filled with pressure oil and a gas bladder of similar figure approximately concentrically housed therein with its upper end secured to the inside of the top end of the pressure vessel, thus the bladder is suspended therefrom towards the bottom of the pressure vessel to face a poppet valve provided at the port in the lower end of the pressure vessel.

In the conventional accumulator of this kind, the pressure oil between the vessel and gas bladder flows out from a port in the bottom of the vessel when the gas bladder expands in a longitudinal direction in which instance, the bottom of the bladder tends to contact the peripherical edge of the poppet valve provided at the bottom of the vessel thereby the portion of the bladder is often ruptured. In order to avoid from this, a cushion cup is sometimes secured on the top of the poppet valve.

With this, when the gas bladder expands, the gas bladder will be avoided from being ruptured since the cushion cup is interposed between the bottom of the gas bladder and poppet valve because the two do not contact directly to each other.

However, when the gas bladder begins to contract from this state, as the top face of the cushion cup is recessed, the cushion cup and gas bladder tend to stick to each other due to vacuum action therebetween. This causes the bladder to be difficult to get way from the cushion cup and this prevents the bladder to easily contract in a longitudinal direction. This not only increases its damage but causes the reduction of capacity efficiency of the accumulator.

One object of the present invention is to eliminate such faults with an improved arrangement of a cushion cup so that the gas bladder will not be prevented from its contraction in a longitudinal direction.

Another object of the present invention is to provide an improved cushion cup in the bottom of the gas bladder in which even though the lower end of the gas bladder becomes heavily thicker with the thickness of the bladder itself and that of the cushion cup, yet that portion will not lose its flexibility against the poppet valve therebelow.

In exercising the present invention to an accumulator, the most suitable construction is consisting of a pressure vessel housing a gas bladder concentrically with its upper end secured to the upper end of the pressure vessel and a poppet valve is provided in the oil outlet port at the bottom of the vessel so that the bottom of the gas bladder comes to be in face-to-face relation to the top face of the poppet valve with a space therebetween, said cushion cup integral with the lower end of the gas bladder is made of rubber or synthetic resineous material.

Other objects and features of the present invention will become more apparent as description proceeds with reference to accompanying drawings in which.

Referring to drawings, 1 is an elongate cylindrical pressure vessel in which is placed a gas bladder of similar figure. In the space between the vessel and the bladder 2 is filled with pressure oil 3. The gas bladder 2 is filled with gas. When pressure liquid flows from a liquid inlet port 5 at the bottom of the vessel 1 into the vessel, the bladder 2 is contracted thereby its capacity is reduced to increase its inner pressure. In the contrary, when pressure liquid flows out of the port 5, the gas bladder 2 expands to reduce its inside pressure.

Figure 3:
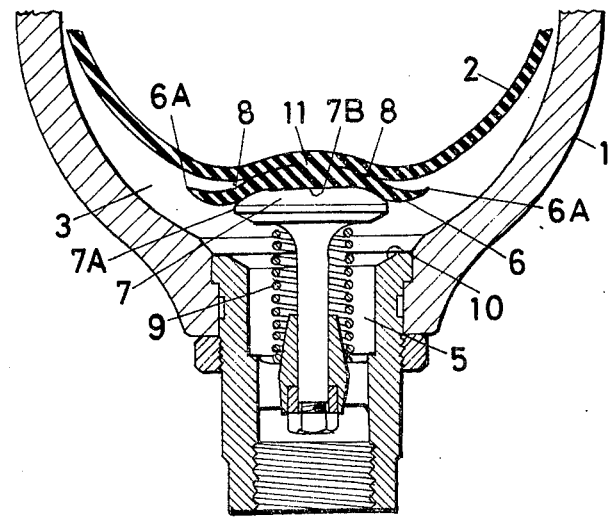
FIG. 3 is an enlarged section view same as in FIG. 2 showing the state that the bottom of the bladder contacts the poppet valve.

Thus the gas bladder 2 expands in a longitudinal direction and the cushion cup 6 provided at its lower end comes to contact the top surface of a poppet valve 6, the cushion cup is depressedly deformed as shown in FIG. 3. Since the bottom portion of the gas bladder 2 does not contact directly to the periphery edge 7A of the poppet valve 6, this portion will never be injured.

Figure 2:
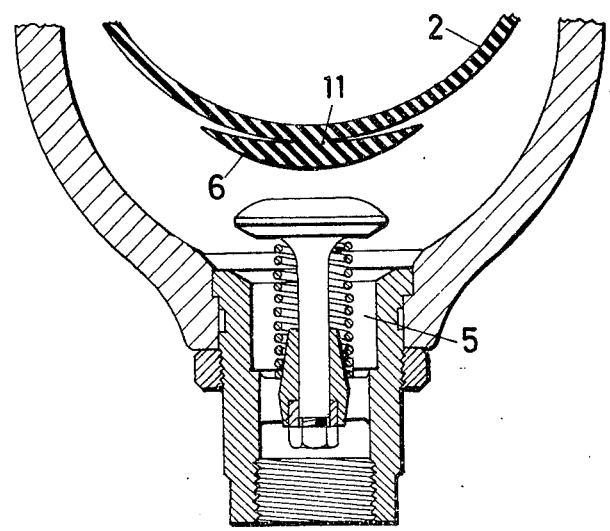
FIG. 2 is an enlarged section view of the essential part of the accumulator.

In the next, when the gas bladder 2 contracts in a longitudinal direction as the cushion cup 6 returns from the shape shown in FIG. 3 to that shown in FIG. 2, there is not produced any resistance in that instance as the cushion cup moves with the contraction of the bladder. Therefore, the pressure liquid entering in the vessel 1 from the port 5 is not subjected to any resistance so that the capacity efficiency of the accumulator is not lessened any.

Since there is provided a clearance 8 between the lower end of the bladder 2 and the top surface of the cushion cup 6, when the bottom of the gas bladder 2 deforms from the state shown in FIG. 2 to that shown in FIG. 3 or vice versa, the bottom portion of the bladder as well as the cushion cup can deform freely along the top surface 7B and periphery edge 7A of the poppet valve 7 so that the bladder 2 is not irregularly deformed and not ruptured by fatigue.

If this clearance 8 is not provided, the portion of the bladder 2 adjacent the periphery edge 6A of the cushion cup 6 will be locally fatigued with the concentrated stress.

When the gas bladder 2 further expands from the state shown in FIG. 3, the poppet valve 7 moves downwardly against the force of the coil spring 9 until it contacts the valve seat 10. In this instance, all liquid 3 in the pressure vessel 3 flows out of the port 5 to close the port 2.

The cushion cup 6 in FIG. 2 and FIG. 3 is being made integral with the gas bladder 2 from rubber or synthetic resineous material with a neck portion 11.

The top end of the gas bladder 12 is secured to the top end B of the pressure vessel 1. 14 is an inlet of gas to the bladder 2.

Figure 1:
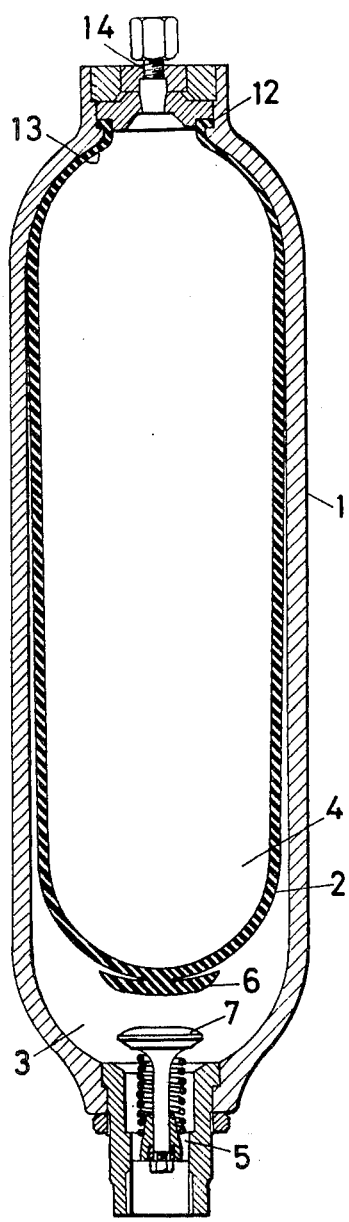
FIG. 1 is a longitudinal section view of an accumulator of the present invention.
Figure 4:
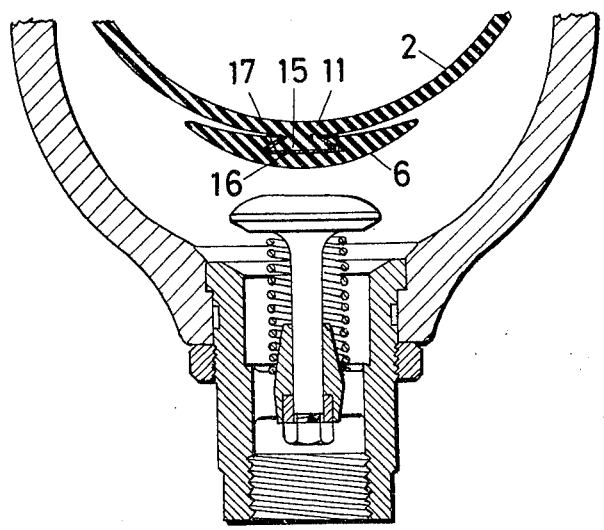
FIG. 4 is an enlarged section view of another embodiment of the portion in FIG. 2.

In FIG. 4, there is shown another embodiment in which same reference numerals 1–11 indicate same parts in FIGS. 1–3. Only the construction of the neck portion between the gas bladder 2 and cushion cup 6 is different.

That is, at the utmost lower end of the gas bladder 2 is provided with an integrally formed projection 15 of flare shape. Also in the central portion of the top of cushion cup 6, a recess 16 in a shape to mate with said projection 15 is formed. Said projection is inserted in the recess 16. These are bonded with rubber paste 17 therebetween, heated and vulcanized. The function of this portion is same as that shown in FIGS. 1–3.

Figure 5:
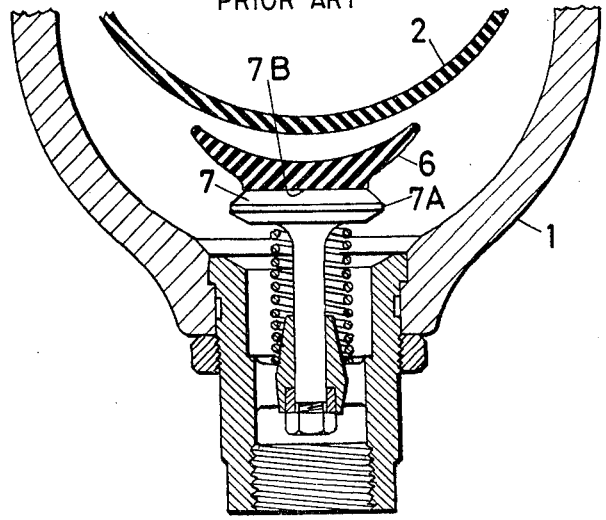
FIG. 5 is a section view of a conventional accumulator showing corresponding portion to that in FIG. 2.

Shown in FIG. 5 is a construction of a conventional accumulator. Therein reference numerals 1–10 indicate same parts in FIGS. 1–4. Therein a cushion cup 6 is not provided at the lower end of the gas bladder 2 and instead, this is secured at the top face 7B of the poppet valve 7 in which respect, this is different from the construction of the present invention.

With this, when the gas bladder 2 expands in a longitudinal direction, its bottom contacts the cushion cup 6. In this instance the gas bladder 2 is avoided from being ruptured in the same way as it does not contact the periphery edge 7A of the cushion cup. However when the gas bladder 2 contracts and comes away from the cushion cup 6, the cushion cup 6 tends to stick to the lower end of the gas bladder to prevent the contraction of the bladder.

What is claimed is:

1. In a hydraulic accumulator having an upright pressure vessel with an oil port at the bottom and a gas inlet at the top with a deformable, uniformly flexible bladder secured to the vessel and separating the gas and hydraulic fluids in the vessel, means securing the bladder to the upper end of the vessel with a central lower portion movable toward the oil port upon expulsion of hydraulic fluid through the oil port, a poppet valve for the oil port having a head positioned on the interior of the vessel, a cushion member carried by the bladder centrally over the poppet valve, said cushion member being flexible and located to engage the head of the poppet valve and extend thereover preventing contact between the bladder material and the poppet valve head and cushioning the bladder against concentrated bending over the poppet valve, said cushion members having a peripheral portion flexible relative to the bladder so that oil may enter a peripheral space between the bladder and cushion member over the poppet valve head periphery and a central portion secured to the bladder in a position centrally over the poppet valve securing the cushion to the bladder for movement therewith upon ingress and egress of the oil in the vessel and insuring bladder contraction away from the poppet valve upon ingress of oil into the vessel.

2. An accumulator as specified in claim 1 in which the bladder and cushion member are integral and of the same material with a neck portion centrally of the cushion member forming an integral connection means between the bladder and cushion member.

3. An accumulator as specified in claim 1 in which the cushion member is secured to the bladder, said bladder having a projection and said cushion member having a recess snuggly receiving said projection and bonding means securing the cushion member to the bladder only about said projection.

* * * * *